Sept. 24, 1935.  C. MORROW  2,015,493
LIQUID CONTROL MECHANISM
Filed Nov. 30, 1931  3 Sheets-Sheet 1
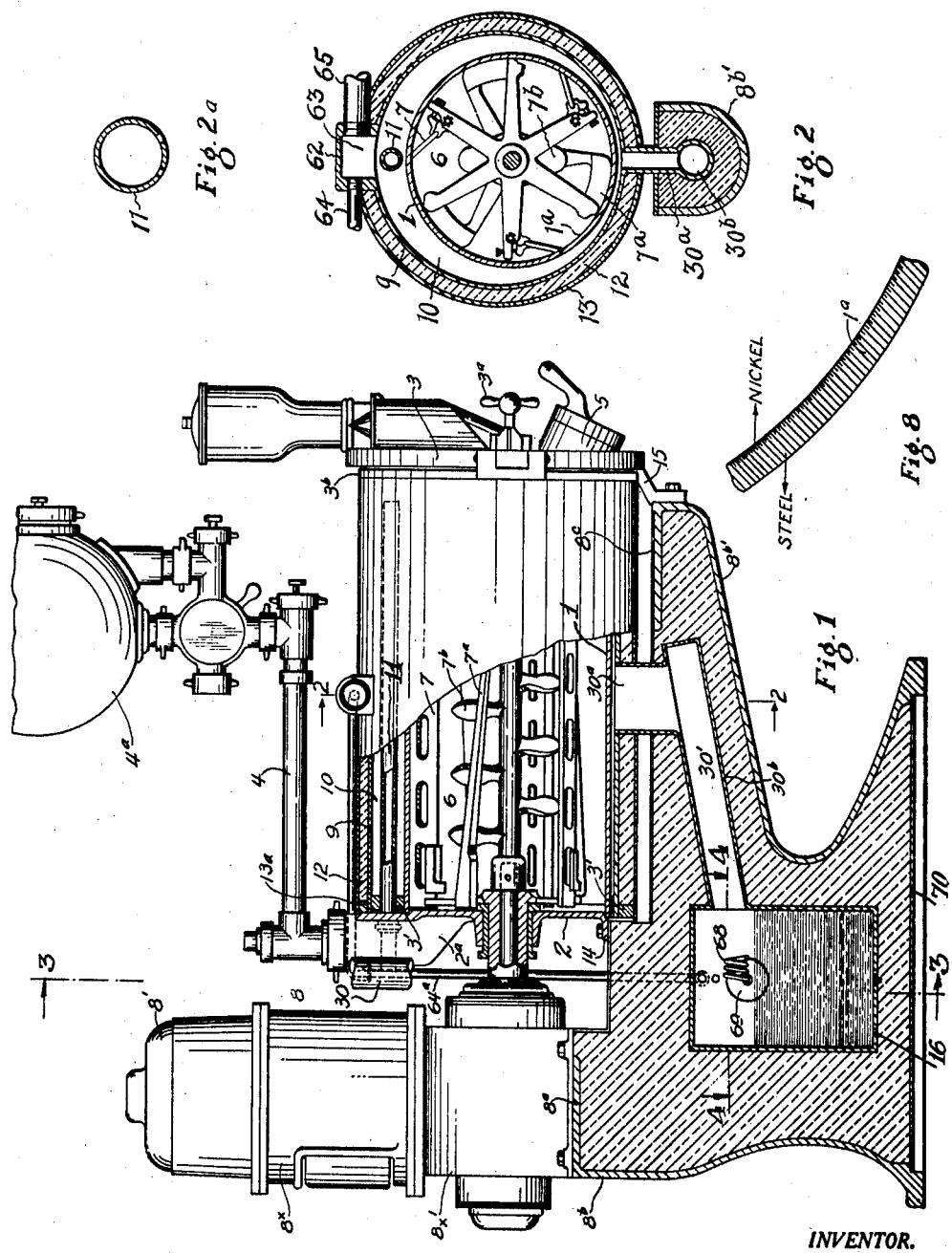
INVENTOR.
Clifford Morrow
BY Geo. B. Pitts
ATTORNEY.

Patented Sept. 24, 1935

2,015,493

UNITED STATES PATENT OFFICE 2,015,493

LIQUID CONTROL MECHANISM

Clifford Morrow, Canton, Ohio, assignor to The
H. H. Miller Industries Company, Canton, Ohio,
a corporation of Ohio Application November 30, 1931, Serial No. 578,227

5 Claims. (Cl. 62—2)

This invention relates to mechanism for controlling the supply of liquid to a chamber or reservoir or a liquid circulating system and particularly the supply of a liquid which has a low boiling point, such for example, liquid ammonia.

The invention may be applied to a system in which the liquid ammonia is utilized as a refrigerant to absorb heat from a contained body of liquid to cool or refrigerate the same, such, for example a mechanism for freezing cream and other materials, as in the making of ice cream, ices and like products.

One object of the invention is to provide an improved mechanism having a reservoir or chamber and means for controlling the supply of the liquid thereto.

Another object of the invention is to provide a mechanism of this character in which the liquid is maintained in a closed chamber or system and the valved supply thereto is controlled by a float within the chamber without the use of mechanical connections between it and the valve.

Another object of the invention is to provide a liquid control and supply mechanism that is relatively simple.

A further object of the invention is to provide an improved cylinder for a freezing mechanism that is capable of withstanding external pressure, is non-corrosive and has a relatively high co-efficient of heat conductivity.

Other objects of the invention will be apparent to those skilled in the art to which my invention relates from the following description taken in connection with the accompanying drawings, wherein Fig. 1 is a side elevation of freezing mechanism having refrigerating means in which liquid ammonia is utilized and provided with a controlled mechanism embodying my invention, parts being broken away.

Fig. 2 is a section on the line 2—2 of Fig. 1.

Fig. 2a is a fragmentary section through the distributing member.

Fig. 8 is a fragmentary section.

Figure 3:
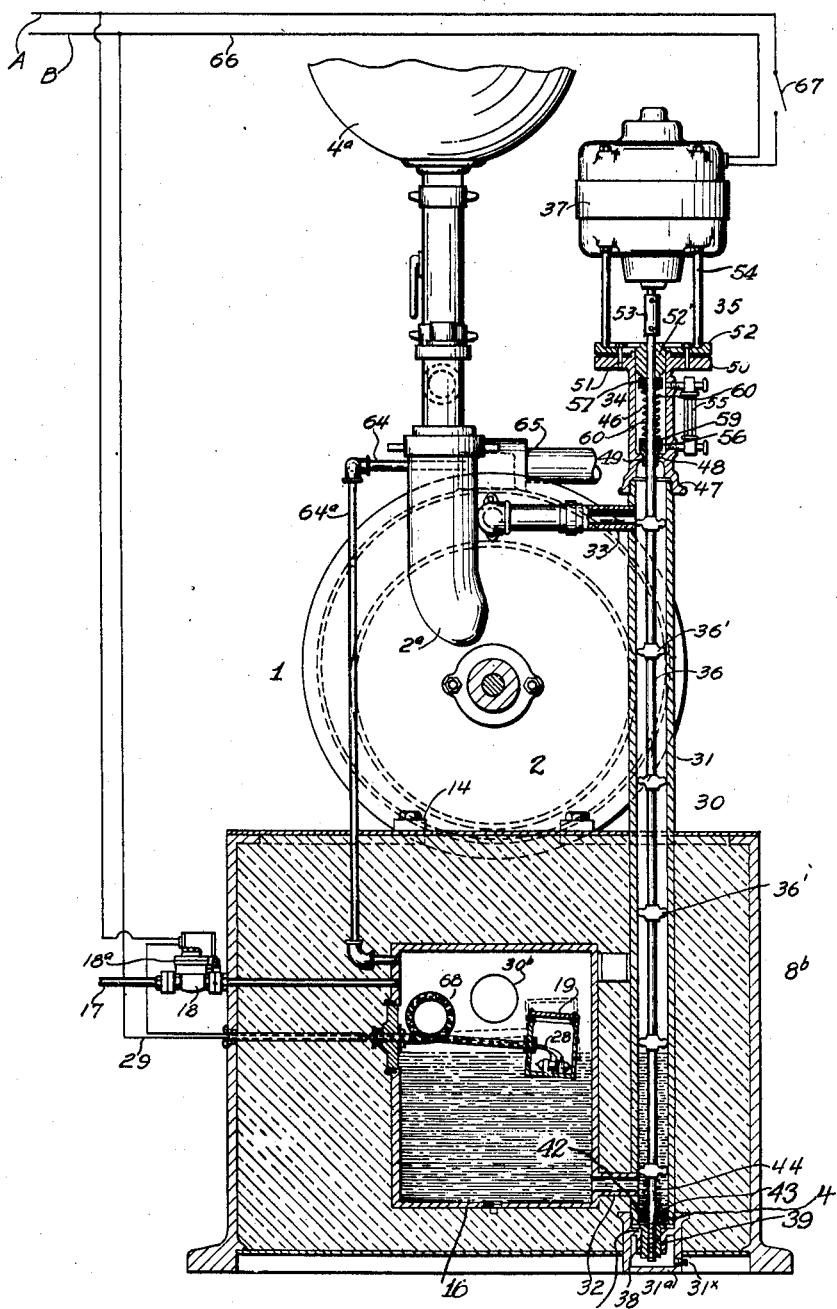
Fig. 3 is a section on the line 3—3 of Fig. 1.
Figure 6:
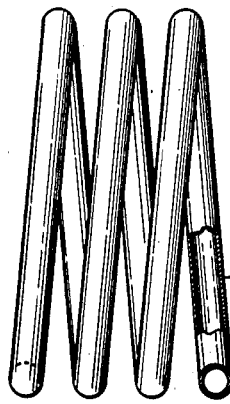
Fig. 6 is a section on the line 6—6 of Fig. 4.
Figure 5:
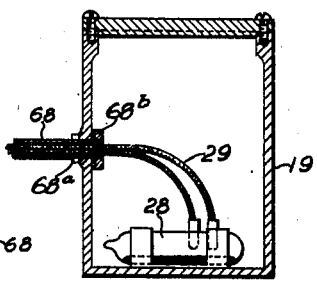
Fig. 5 is a section on the line 5—5 of Fig. 4.

I have illustrated my invention as forming part of a cooling or refrigerating system which is applied to the walls of a container adapted to receive and hold liquid that is to be cooled or refrigerated by the refrigerant in the system. The specific type of illustrated container consists of a cylinder having suitable agitating means therein, whereby batches of materials or "mixes" may be introduced therein, frozen to the desired consistency and discharged.

In the drawings, I indicates a cylinder in which batches of materials are successively frozen, the cylinder being closed in a liquid tight manner at its rear end by a rear head 2 and having a removable front head 3. The cylinder I is preferably formed from a single wall 1a of material approximately ⅜" in thickness. The wall 1a is formed of nickel and steel (see Fig. 8), that is the inner portion is formed of nickel and the outer portion is formed of steel, the thickness of the nickel being substantially 20% of the total thickness of the wall. The nickel and steel are first cast or otherwise formed and heated and positioned face to face and rolled together while hot into integral relation. The nickel portion serves as a wall having non-corrosive characteristics, whereby milk and cream and mixes containing these materials may contact therewith, whereas the steel portion serves to impart strength to the wall to resist external pressure. The rear head 2 is provided with an inlet duct 2a connected with a valve controlled supply pipe 4 leading from a suitable measuring tank 4a. The front head 3 is provided with a valve controlled outlet 5. No claim is made to the construction of the cylinder as above described as the same forms the subject-matter of my co-pending application Ser. No. 546,689. The head 3 may be constructed as shown in Letters Patent No. 1,449,623, granted to Leroy S. Pfouts. The head 3 is secured in position by detachable elements 3a to a ring 3b, which is secured in a gas and liquid tight manner to the front end of the cylinder I. The ring 3b and head 3 are provided with ground inter-engaging seats so that when the latter is secured in position the cylinder I is sealed against leakage. 6 indicates an agitating and ejecting mechanism within the cylinder I and preferably comprises inner and outer rotatable members, the outer members carrying suitable scrapers 7 and one or more ejecting elements 7a and the inner member carrying propelling blades 7b. The agitating and ejecting mechanism is preferably constructed substantially similar to that shown in Letters Patent No. 945,570 to John C. Miller. The rotatable agitating members are connected to two shafts, respectively, which extend through the rear head 2 and are driven in a well known manner by a suitable driving mechanism 8.

The driving mechanism is suitably mounted on a bed 8a, which forms an integral part of a base 8b, arranged to support the freezing cylinder as later set forth. The driving means 8 shown herein consists of an electric motor 8' the shaft of which operates through suitable reduction gearing, within the casing 8x, to drive gears within the gear box 8x'. The base 8b is preferably hollow for manufacturing purposes and to provide space for parts hereinafter referred to. The upper portion of the base 8b is elongated and provided with a forward extension 8b'. The extension 8b' has a top wall 8c. Between the top wall and bed 8a, the base is open to receive the parts to be later referred to, certain of which extend upwardly beyond the base. The bottom of the base 8b is also open to permit assembly of these parts therethrough when desired.

9 indicates a cylinder surrounding the cylinder 1 and spaced therefrom, the space between the cylinders being closed in a gas and liquid tight manner at their rear and front ends by rings 3' (one being shown in Fig. 1), thereby forming entirely around the cylinder 1 a chamber or space 10 into which the liquid ammonia is discharged by a distributor 11, to be later referred to. The cylinder 1 and cylinder 9 are eccentrically related to provide in the space 10, above the cylinder 1, ample room for the distributor 11. The space 10 also provides adequate space for the gases, which are generated by reason of the ammonia flowing over the walls of the container, especially where the temperature of the "mix" in the container is relatively high, for instance, when a new batch of "mix" is introduced into the cylinder 1. The enlarged space also provides room in which the liquid and gas may become separated, thereby permitting the gas to rise above the cylinder 1, so that dry gas will be sucked through the pipe (hereinafter referred to) leading to the compressor and liquid will flow or gravitate over the walls of the cylinder 1. The outer wall of the cylinder 9 is suitably insulated with a jacket of cork or other non-heat conducting material 12, such jacket being enclosed by a casing 13. The casing 13 is preferably closed at its ends by rings 13a (one thereof being shown in Fig. 1).

The rear head 2 is provided with spaced lugs 14, which are secured to inturned flanges on the base 8b, and the ring 3b is provided with a depending bracket 15 which is secured to the extension 8b'. As shown, the lugs 14 and bracket 15 serve to support the cylinder 1 and parts associated therewith on the base 8b.

16 indicates a combined reservoir and receiver for the liquid ammonia. 17 indicates a pipe connected to the reservoir 16 and leading from a supply of liquid ammonia, to maintain therein a substantially predetermined quantity in the reservoir 16. The pipe 17 is provided with a valve 18, which is automatically controlled by a float 19 to replace the liquid ammonia which gasifies or is used up to effect cooling or freezing in the operation of the apparatus. The float 19 is preferably operable within the reservoir 16. The supply pipe 17 leads into the reservoir 16 above the normal level of the ammonia therein.

The valve 18 is preferably of a magnetic type, the casing for the valve having a portion 18a enclosing a solenoid the coil of which is energized when the circuit 29 is closed by the mercoid switch 28 (to be later referred to) and de-energized when the circuit is broken. So long as the level of the ammonia remains substantially normal, the float will maintain the mercoid switch in the position shown in dotted lines in Fig. 3, with the circuit open. As the valve element of the valve is normally maintained closed by a spring in the valve casing, the supply of ammonia will be cut off, but upon the lowering of this normal level, the mercoid switch 28 will be moved to close the circuit, the effect of which will be to open the valve 18 and allow ammonia to flow into the chamber 16 until the float 19, in rising, breaks the circuit through the switch 28.

30 indicates a conduit leading from the bottom of the reservoir 16 to the distributor 11, being preferably detachably connected to the rear end of the latter. The conduit 30 comprises a vertical leg 31, closed at its lower end in a liquid tight manner by a casing 31a, a pipe 32 connected to the lower portion of the leg 31 and the reservoir 16 and a branch pipe 33 leading from the upper portion of the leg 31 and detachably connected to the rear end of the distributor 11, the branch pipe 33 preferably leading through the head 2 and ring 3'. The upper end of the leg 31 is closed by a tubular fitting indicated as an entirety at 34.

30' indicates a return conduit leading from the space 10 to the reservoir 16. The conduit 30' comprises (a) a vertical section 30a, preferably elongated in a direction longitudinally of the cylinder 1 and leading through the casing 13, insulation 12 and an opening formed in the lowest portion of the wall 9, and (b) an inclined section 30b, connected to the upper portion of the reservoir, whereby the liquid ammonia discharged onto the cylinder 1 and flowing around the walls thereof may freely gravitate into the reservoir 16. The section 30a may be welded or otherwise secured to the walls of the opening formed in the cylinder 9.

35 indicates as an entirety means for pumping or inducing a flow of the liquid ammonia from the reservoir 16 to and through the distributor 11. The pumping means preferably comprise the following elements: 36 indicates a shaft extending longitudinally through the leg 31 and tubular fitting 34 and connected to the shaft of an electric motor 37 mounted on the upper end of the fitting 34. The shaft 36 is hollow for a purpose later set forth. At spaced points along the shaft 36 within the leg 31 are provided a plurality of propelling elements 36', certain of which are arranged below the level of the ammonia in the leg 31. Each element 36' consists of a collar fixed to the shaft and radial blades oppositely inclined so that when the shaft 36 is driven in one direction the blades will elevate the ammonia and induce a flow thereof upwardly through the leg 31 and to and through the distributor 11. The lower end of the shaft 36 is mounted in a bushing 38 which fits into a collar 39 carried by a rib 40 provided in the casing 31a above its bottom wall, the flange of the bushing engaging the upper surface of the rib. 41 indicates a cup shaped member supported on the rib 40. The bottom of the member 41 is formed with an opening through which the shaft 36 extends. The member 41 around the shaft 36 is filled with packing 42 and the packing is covered with an annular plate 43, which is engaged by the lower end of a coiled spring 44, the upper end of the spring preferably engaging the collar of the adjacent propelling element 36'. The spring 44 is normally under tension to exert pressure through the plate 43 on the packing and to maintain the cup-shaped member 44 against the rib 40.

The fitting 34 is preferably of tubular shape and provided at its lower end with an enlarged collar 47 internally threaded for connection, in a gas and liquid tight manner to the upper end of the leg 31. Within the fitting 34 and above the collar 47, the fitting is provided with a transverse wall 48 formed with an opening in which fits a flanged bushing 49, the latter forming a bearing for the shaft 36. The upper end of the fitting 34 is provided with an external flange 50, to which is secured, by bolts 51, a circular plate 52, the bottom surface of the plate being formed with an annular groove to receive the annular end of the fitting to close and seal the upper end of the latter. The central portion of the plate 52 is preferably thickened to provide a suitable bearing 52' for the shaft 36, which extends through the plate for connection by a coupling 53 to the shaft of the motor 37. The motor 37 is rigidly supported on the plate 52 by a plurality of up-standing rods 54.

The space between the wall 48 and plate 52 constitutes an oil chamber 46, the amount of oil in the chamber being indicated by a glass gage 55. Leakage of gas or liquid ammonia from the conduit 30 into and through the fitting is prevented by the following means: 56, 57, indicate cup-shaped members the bottoms thereof being formed with openings through which the shaft 36 extends. The bottom of the member 56 rests face to face on the upper end of the bushing 49 and the member 57 engages face to face with the lower surface of the bearing 52'. Each cup-shaped member 56, 57, around the shaft 36 is filled with packing which is covered with an annular plate 59. 60 indicates an expansion spring coiled around the shaft and engaging the plates 59 and normally acting therethrough to compress the packing around the shaft and yieldably maintain the cup-shaped members against the bushing 49 and bearing 52'. The oil in the chamber 46 serves to lubricate the shaft as it rotates in the bushing 49 and bearing 52', and the cup shape members as they rotate. For this purpose, the convolutions of the spring are so arranged or wound with respect to the direction of rotation of the shaft 36, that they act as elevating means to deliver oil to the bearing 52' and sealing member 57. As a thin film of oil will be maintained between these members and the bushing 49 and bearing 52' and these members are yieldingly maintained against the latter, a gas and oil seal results; and as the spring 60 normally acts to compress the packings in these members, danger of gas escaping around the shaft 36 is eliminated.

By preference one side wall of the shaft 36 is formed with an opening (not shown) in the upper portion of the chamber 46, that is, above the level of the lubricating oil therein. The purpose of this opening is to permit a portion of the oil which is carried upwardly by the spring 60, due to its rotation with the shaft 36, to flow into the latter and gravitate therethrough to the opening or ports formed in the lower end of the shaft and flow into the grooves formed in the collar 38 to lubricate the adjacent bearing walls.

The casing 31a may be provided with a pet cock or plug 31x to drain out excess oil therein, either due to that supplied from the chamber 46 and/or otherwise accumulating in the system; or such casing may be connected with the chamber 46 by a return pipe having a pump, to return the oil to the chamber.

The distributor 11 comprises a pipe disposed in the space 10 above the cylinder 1 and extending substantially from end to end thereof. On its lower side and from end to end the distributor is formed with a plurality of discharge openings through which the liquid ammonia flows. By preference, I provide two longitudinal rows of openings each row being disposed at one side of a vertical plane cutting the axis of the pipe 11, to insure discharge of substantially equal amounts of liquid ammonia to either side of the cylinder 1, and thereby provide equal temperature changing effects on all porttions of the latter.

It will be apparent that more than one distributor may be provided in the space 10 when found desirable.

The rear end of the distributor 11 is detachably connected to the inner end of the branch pipe 33, by a suitable coupling, to permit removal of the distributor.

62 indicates a hollow fitting secured in a gas and liquid tight manner to the walls of an opening 63 formed in the upper portion of the wall 9. From one side of the fitting 62 leads a relatively small pipe 64, which is connected by a pipe 64a to the reservoir 16 to provide a pressure equalizing connection between the space 10 and space above the ammonia level in the reservoir 16, whereby such level due to the pumping of the ammonia to the distributor and flow thereof to the reservoir will not be affected. From the other side of the fitting 62 leads a relatively large pipe 65, connected to the suction side or intake of a compressor (not shown) to carry off all gas which may be generated in the system or space 10.

The motor 37 is connected to the supply mains A, B, by a circuit 66, controlled by a switch 67 of any desired construction.

Figure 7:
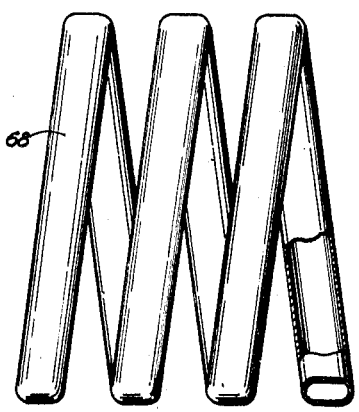
Fig. 7 is a section similar to Fig. 6, but showing a different form of construction.
Figure 4:
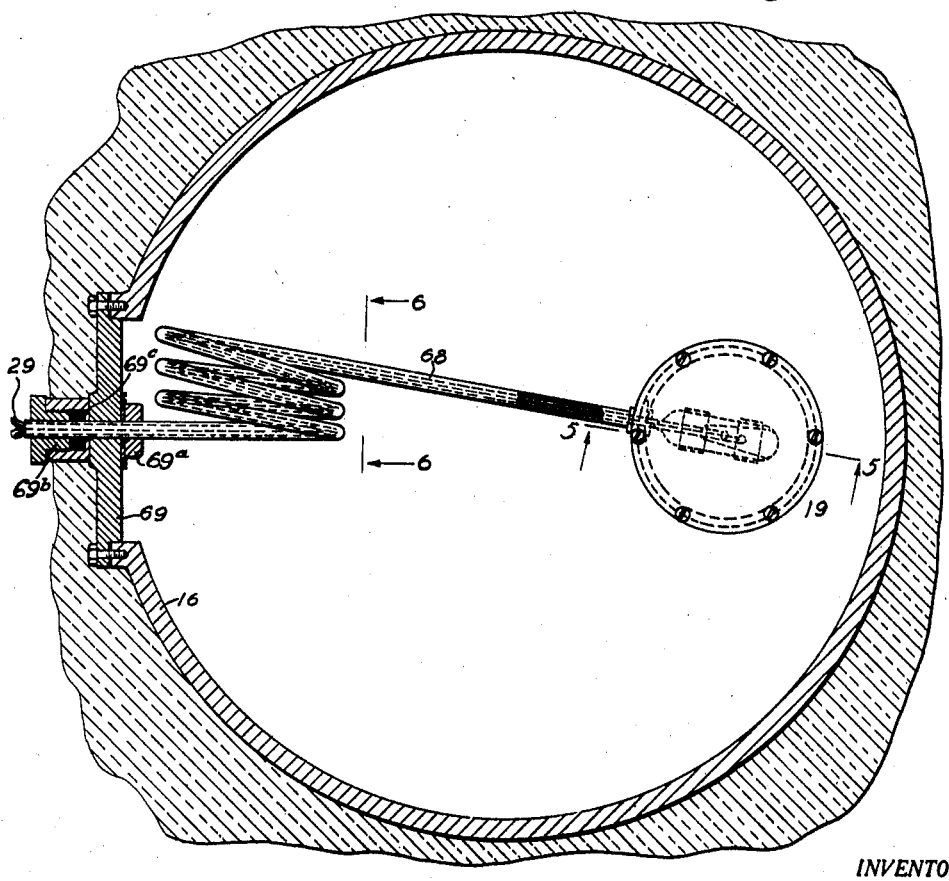
Fig. 4 is a fragmentary section substantially on the line 4—4 of Fig. 1.

The float 19 comprises a hollow member in which the mercoid switch 28 is suitably mounted. The member 19 consists of a round casing having a cover which is removably secured in sealed relation to the open end of the casing. The hollow member is supported on the outer end by a resilient device 68 secured at its inner end to one side wall of the reservoir 16. The intermediate portion of the device 68 is wound into one or more coils, to provide a device of adequate length whereby it may be readily flexed upwardly due to the rise of the liquid level therein. The device 68 preferably consists of a hollow pipe having relatively thin walls the inner end of which opens into the interior of the hollow member 19 and its outer end opens exteriorly to the reservoir, so that the leads 29 constituting the circuit for the coil of the solenoid, from the mercoid switch 28 may extend from the interior of the float member 19 to the exterior of the reservoir without danger of the leads coming in contact with the liquid ammonia. For this purpose, the ends of the hollow member 68 lead through openings formed in the walls of the float member and reservoir and are suitably sealed therein to prevent leakage. The resilient device 68 may be formed from a round pipe or tube of resilient material or a pipe or tube of resilient material that is flattened in cross section, as shown in Fig. 7. The resilient supporting device is preferably rigidly secured to a plate 69, which removably closes an opening in the reservoir side wall to permit assembly and removal of the float member, suitable gaskets being used to insure sealing of the opening. In the preferred arrangement, the outer end portion of the resilient member 68 is provided with an annular shoulder 68a arranged to engage the outer wall of the float member 19, and on the inner side of the latter the member 68 is provided with a collar 68b over which the free end of the member 68 is riveted, suitable gaskets being used to insure a liquid tight relation between the member 68 and the walls of the float member 19. Instead of riveting the end of the member 68 over the collar 68b, that portion of the member 68 within the float member 19 may be externally threaded and the collar threaded internally and screwed onto the member 68 and tightened against the wall of the float member 19, suitable gaskets being used to insure liquid tightness. In either form of construction, the outer and inner walls of the float member 19 around the opening therethrough may be shaped to form suitable engaging surfaces for the shoulder 68a and the clamping element mounted on the inner side of the float member. The outer end of the resilient member 68 extends through an opening formed in the plate 69. The end portion of the member 68 is provided with a collar 69a arranged to engage the inner face of the plate 69. The outer face of the plate 69 is provided with a hollow boss into which is screwed a sleeve 69b which is tightened against a packing 69c to form a sealed joint and to secure the member 68 and plate together. Any other suitable means may be employed to secure the outer end of the member 68 to the plate 69 and in the opening therethrough and in a manner to prevent leakage.

The device 68 serves normally to swing the float member 19 downwardly, its extended inner end portion being normally in the position shown in full lines in Fig. 3. When the member 19 moves to this latter position, the mercoid switch 28 operates to close the circuit 29 to the solenoid within the casing 18a, whereby the coil of the solenoid is energized and operates to open the valve 18, so that liquid ammonia flows into the reservoir 16. As the liquid level in the reservoir rises, the float member 19 is raised or swung upwardly, and when the normal level of the liquid is reached, the mercoid switch 28 opens the circuit 29, the effect of which is to de-energize the solenoid coil and close the valve, thus shutting off the supply of the liquid ammonia.

The operation of freezing batches of materials or "mixes" may be described as follows:

In such operation, the driving means 8 is started to set the agitating and ejecting mechanism 6 in operation. Next, a measured quantity of the "mix" from the holder or tank 4a is introduced into the cylinder 1 through the inlet 2a. Next, the switch 67 is closed to start the motor 37. As soon as the motor 37 starts operating, liquid ammonia is pumped to the distributor 11 from which it is sprayed or discharged onto the walls of the cylinder 1, over which the ammonia flows as it gravitates to the bottom of the space 10 and through the return conduit 30' to the reservoir 16, from which the ammonia may be again pumped or circulated to the distributor. The ammonia, while flowing over or around the cylinder, provides rapid heat transfer from the batch of "mix" in the cylinder 1 allowing the ammonia to carry the absorbed heat away in the form of gas to the compressor. The surplus or unused liquid ammonia gravitates to the bottom of the space 10 and through the return conduit 30', as above set forth. When the "mix" is frozen to the desired degree, the motor 37 is stopped. This operation instantly cuts off the flow of the ammonia to the distributor and that portion of the ammonia in the distributor and flowing over the walls of the cylinder immediately gravitates to the reservoir, thereby completely draining the space 10 of liquid ammonia; accordingly, refrigeration effect upon the batch of material ceases substantially instantly the motor 37 is stopped, thereby permitting the frozen "mix" to be whipped to the desired swell or over-run. The completed batch is then discharged into suitable receivers and a new batch of "mix" introduced into the cylinder 1. The switch 67 is then closed to set the motor 37 in operation, which substantially instantly supplies liquid ammonia to the distributor to effect flow thereof over the cylinder 1.

From the foregoing description it will be seen that a full supply of liquid ammonia is substantially instantly applied to the entire exterior surface of the cylinder 1 when the motor 37 is started and when the motor 37 is stopped, the entire application of the ammonia thereto substantially instantly ceases. This permits positive control of the refrigeration and tends to speed the operation of freezing and whipping successive batches of the "mix". Also, as the liquid ammonia is discharged above the cylinder 1 and flows downwardly thereover, it continuously washes the walls of the latter so that any and all gas that may form in pockets between these walls and the liquid flowing downwardly is dislodged from these walls and separated from the liquid, the effect of which is to insure uniform refrigeration effects over the entire cylinder. Since the scrapers 7 have a revolving speed of approximately 175 revolutions per minute, it will be seen that a very thin film of material is allowed to adhere to the interior of the inner surface of the cylinder 1 between adjacent scrapers as they traverse the cylinder wall before the next, rearward scraper engages therewith to remove it. Accordingly, the uniform application of the liquid ammonia to the exterior surface of the cylinder in conjunction with the operation of the scrapers is advantageous to insure a uniform, smooth frozen consistency of the "mix" wherein the ice crystals are finely and uniformly divided.

To provide against frosting and condensation on exposed walls, the receiver 16, conduit 30' and that portion of the conduit 30 within the base 8b are suitably insulated as shown at 68. The bottom of the base 8b is preferably closed by a removable plate 70.

My construction is advantageous for the reason that discharge of the liquid ammonia from the space 10 is not dependent upon the generation of gas therein to expel the liquid ammonia or by operation of one or more valves, but it permits the liquid ammonia to at all times gravitate or drain from the space 10 so that danger of explosions, due to injection of hot water or steam into the cylinder 1, is entirely eliminated. In my construction of apparatus the liquid ammonia is applied to the cylinder or container mechanically and gravitates thereover, as contradistinguished from a thermal or flooded system, for which reason the construction is relatively simple, the heat transfer is effectively and positively controlled to insure rapid, as well as uniform cooling or freezing. In such construction and method of operation, it will be noted that the chamber 10 is directly connected to the intake side of the compressor and upper portion of the reservoir, so that generated gases may be carried off; also, that no valves are required to be operated to effect complete freezing of each batch or the freezing of successive batches; also, since the liquid ammonia always flows through the chamber 10 in one direction and does not surge into and out thereof, its supply and cut-off are positively controlled and time is saved in carrying out the successive steps in freezing each batch, as well as applying the liquid ammonia to each new batch to be frozen.

By arranging the cylinders 1 and 9 eccentrically and disposing the eccentric radius of the latter in the position shown, an adequate sized gas collection and separation chamber is readily provided above the down-flowing liquid, so that danger of liquid being carried into the suction pipe 65 is minimized.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In apparatus of the class described, the combination of a chamber for a liquid, a supply pipe leading to said chamber, a magnetically operated valve in said pipe exteriorly of said chamber, a float in said chamber, a connection between said float and a wall of said chamber permitting said float to rise and fall with the level of the liquid, said connection comprising a resilient hollow member supported at its outer end on and extending through one wall of said chamber and carrying the float on its inner end, and circuit closing means carried by said float having electrical connection with the coil of the said valve operating means and arranged to be actuated by the rise and fall of said float, the electrical connection to and from said circuit closing means leading through said hollow member to the exterior of said chamber.

2. In apparatus of the class described, the combination of a chamber for a liquid, a supply pipe leading thereto, a magnetically operated valve in said pipe exteriorly of said chamber, a float in said chamber, said float being shaped to form a space having a sealed removable door, a resilient hollow member supported at its outer end on and extending through one wall of said chamber and carrying said float at its inner end and arranged to permit said float to rise and fall with the level of the liquid in said chamber, said member communicating with said space at its inner end and exterior to said chamber at its outer end, and circuit closing means in the space in said float and having leads extending through said hollow member for the circuit for the coil of the valve operating means and arranged to be operated by the rise and fall of said float.

3. In apparatus of the class described, the combination of a chamber for a liquid, a supply pipe leading thereto, a magnetically operated valve in said pipe exteriorly of said chamber, a float in said chamber, said float being shaped to form a space having a sealed removable door, a resilient hollow member supported at its outer end on and extending through one wall of said chamber and carrying said float at its inner end and arranged to permit said float to rise and fall with the level of the liquid in said chamber, said member communicating with said space at its inner end and exterior to said chamber at its outer end, and circuit closing means in the space in said float and having leads extending through said hollow member for the circuit for the coil of the valve operating means and arranged to be operated by the rise and fall of said float, said circuit closing means consisting of a mercury switch.

4. In apparatus of the class described, the combination of a chamber for liquid, a liquid supply pipe leading thereto, a valve in said pipe exterior to said chamber, magnetically actuated means exterior to said chamber for operating said valve, a hollow float having a hollow resilient connection leading through one wall of said chamber and supported in said wall and allowing said float to rise and fall with the liquid level in said liquid chamber, circuit control means within said float arranged to be operated by the rise and fall of said float, and leads extending from said circuit control means through said hollow connection to the coil of said valve operating means.

5. In apparatus of the class described, the combination of a container, a casing surrounding said container in spaced relation thereto, means in the space between said casing and container, above the latter, for distributing liquid refrigerant onto said container, a reservoir for a liquid refrigerant, means for conveying liquid refrigerant from said reservoir to said distributing means, a conduit between the upper portion of said casing and said reservoir, a liquid supply pipe connected to said reservoir, a valve in said pipe exterior to said casing, magnetically operated means exterior to said casing for operating said valve, a float in said reservoir, a hollow member extending through one wall of said reservoir and supporting said float at its inner end, said member within said reservoir being coiled whereby the float is free to rise and fall with the liquid level therein, circuit closing means within the float and operated by the movement thereof, and leads extending through and enclosed by said hollow member and connected to said circuit closing means and the coil of said magnetically operated means.

CLIFFORD MORROW.